(12) United States Patent
Chen et al.

(10) Patent No.: US 7,612,844 B2
(45) Date of Patent: Nov. 3, 2009

(54) WIDE VIEWING ANGLE LIQUID CRYSTAL DISPLAY PANEL

(75) Inventors: Po-Lun Chen, Chia Yi (TW); Ting-Jui Chang, Taipei (TW); Chih-Wen Chen, Tainan (TW)

(73) Assignee: Au Optronics Corp., Hsinchu (TW)

( * ) Notice: Subject to any disclaimer, the term of this patent is extended or adjusted under 35 U.S.C. 154(b) by 688 days.

(21) Appl. No.: 11/346,324

(22) Filed: Feb. 3, 2006

(65) Prior Publication Data

US 2006/0187394 A1     Aug. 24, 2006

(30) Foreign Application Priority Data

Feb. 24, 2005    (TW)    ............... 94105580 A

(51) Int. Cl.
*G02F 1/1333*    (2006.01)

(52) U.S. Cl. .................. 349/86; 349/88; 349/130

(58) Field of Classification Search ............ 349/88, 349/86, 130, 178, 117, 96, 93, 132
See application file for complete search history.

(56) References Cited

U.S. PATENT DOCUMENTS 5,895,106 A  *  4/1999  VanderPloeg et al. ....... 349/120
6,429,914 B1 *  8/2002  Kubota et al. ................. 349/86

* cited by examiner

*Primary Examiner*—Thoi V Duong
(74) *Attorney, Agent, or Firm*—Thomas, Kayden, Horstemeyer & Risley

(57) ABSTRACT

A wide viewing angle liquid crystal display (LCD) panel comprising an upper substrate, a lower substrate, and a liquid crystal (LC) layer is provided. The upper substrate is assembled above the lower substrate. The LC layer is interposed between the two substrates. The LC layer has LC molecules mixed with a predetermined percentage of negative anisotropic monomers. The optical axes of the monomers and the LC molecules as the LCD panel in dark state forms an angle less than 10 degree.

19 Claims, 4 Drawing Sheets

WIDE VIEWING ANGLE LIQUID CRYSTAL DISPLAY PANEL

This application claims the benefit of Taiwan application Serial No. 094105580, filed Feb. 24, 2005.

BACKGROUND OF THE INVENTION (1) Field of the Invention

This invention relates to a liquid crystal display (LCD) panel, and more particularly to a wide viewing angle LCD panel.

(2) Description of the Related Art

Attending with the improvement of thin film transistor (TFT) fabrication technology, LCD with the advantages of slim size, low power consumption, and low radiation emission, has become popular among various electronic devices, such as personal digital assistants (PDA), notebooks (NB), digital cameras (DC), digital videos (DV), cell phone, etc. However, the viewing angle of LCD at present is usually limited due to the optical behavior of liquid crystal (LC) layer with respect to light beams at various tilt angles.

Implementations for improving viewing angle of LCD are taught in some patents, see, e.g., American patent, U.S. Pat. No. 5,410,422, "GRAY SCALE LIQUID CRYSTAL DISPLAY HAVING A WIDE VIEWING ANGLE". FIG. 1 describes the method taught in the patent, to interpose a birefringence compensator 110 between two linear polarizers 112,114. Light beam traveling through the LC layer 116 with a large tilt angle is usually engaged with phase retardation different from the light beam traveling normal to the LCD panel. The disclosed birefringence compensator 110 characterized with a negative phase retardation to compensate the phase retardation difference so as to increase viewing angle.

It is understood that the birefringence compensator 110 can be adapted to various LC molecule types, e.g., vertical aligned (VA) LC molecules, twisted nematic (TN) LC molecules, in-plane switch (IPS) LC molecules, etc. by properly compensating the phase retardation difference. However, the birefringence compensator 110 increases the thickness and the weight of the LCD panel, which leads to an important issue of increasing viewing angle without the benefit of birefringence compensator.

SUMMARY OF THE INVENTION

A wide viewing angle LCD panel comprising an upper substrate, a lower substrate, and an LC layer, is provided in the present invention. The lower substrate is disposed below the upper substrate. The LC layer is interposed between the two substrates. LC molecules within the LC layer are mixed with a predetermined proportion of anisotropic monomers. The angle between the directions of the optical axes of the anisotropic monomers and the LC molecules as the LCD panel in a dark state is less than 10 degree.

In an embodiment of the present invention, at least part of the monomers are polymerized to form a polymer network.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
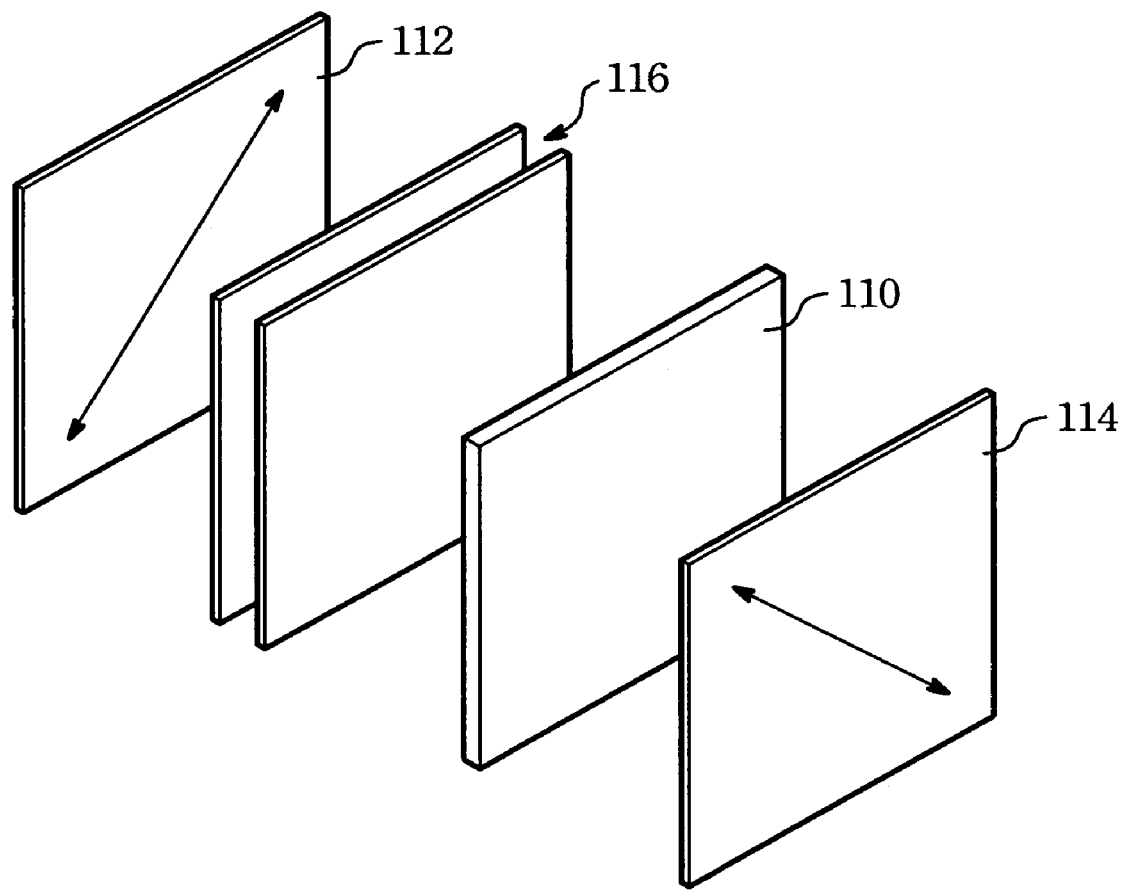
FIG. 1 is a schematic view depicting a traditional LCD panel.

As described in the related art of FIG. 1, the birefringence compensator 110 shows an opposite retardation characteristic with respect to the LC layer 116, so as to compensate the phase retardation deviation for light beams with large tilt angles. By compensating the retardation deviation, the light leakage event can be prevented and the viewing angle can be increased.

Figure 2:
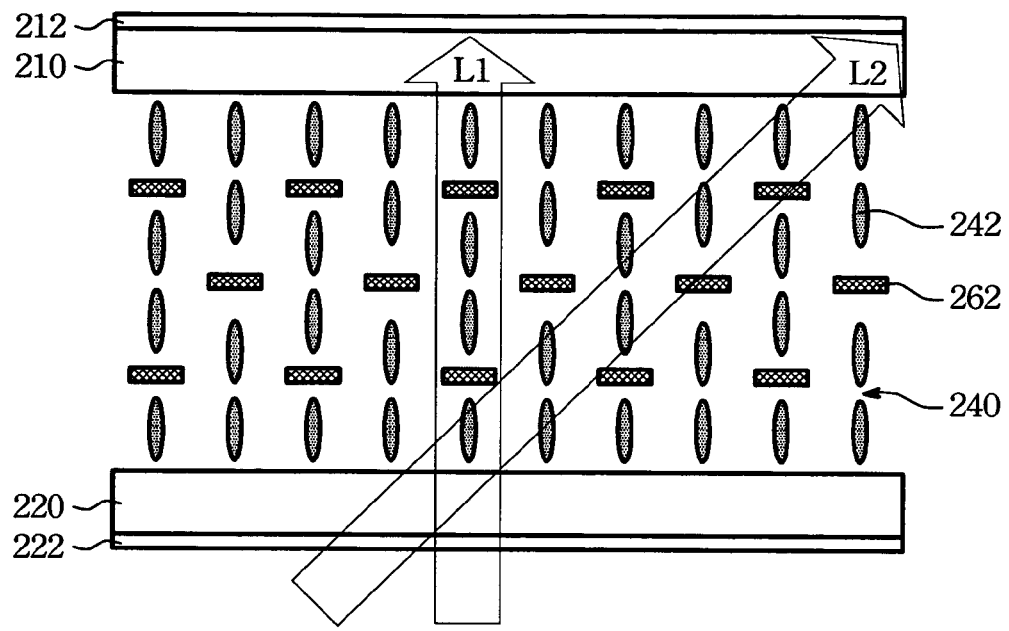
FIG. 2 is a cross section view depicting a first preferred embodiment of a wide viewing angle LCD panel in accordance with the present invention.

FIG. 2 shows a first preferred embodiment of a wide viewing angle LCD panel in accordance with the present invention. The LCD panel has an upper substrate 210, a lower substrate 220, and an LC layer 240. The lower substrate 220 is disposed below the upper substrate 210. A lower polarizer 222 is formed on a lower surface of the lower substrate 220. An upper polarizer 212 is formed on an upper surface of the upper substrate 210.

The LC layer 240 is interposed between the upper substrate 210 and the lower substrate 220, and it is composed of LC molecules 242 mixed with a predetermined proportion of optical anisotropic monomers 262 uniformly distributed in the LC layer 240. The LC molecules 242 are vertical aligned (VA) negative-type LC molecules. It is understood that the negative type LC molecules 242 has a tendency to change their optical axes a1 in a direction perpendicular to the applied electrical field. In addition, as shown, when the LCD panel is in a dark state, the angle between the directions of the optical axes a1,a2 of the monomers 262 and the LC molecules 242 respectively is less than 10 degree, or even pointing toward the same direction.

Figure 2A:
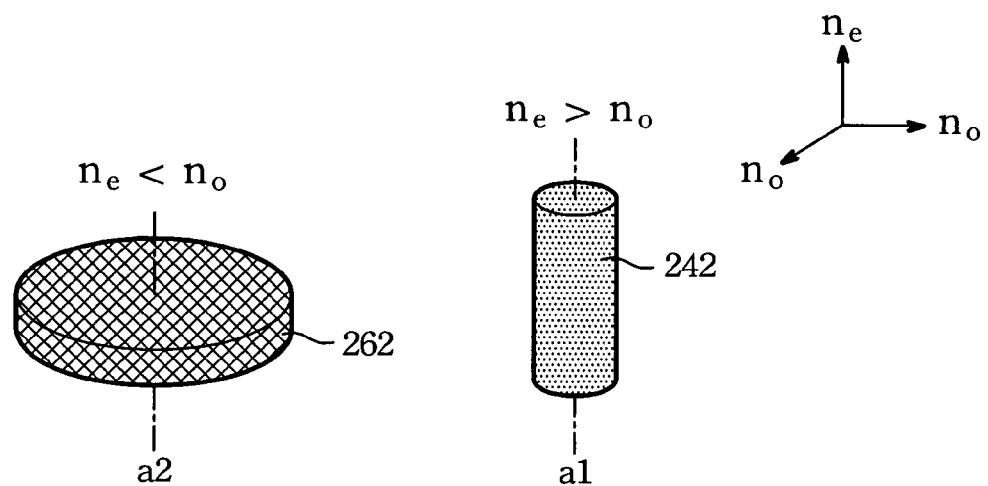
FIG. 2A is a schematic view depicting a positive anisotropic LC molecule and a negative anisotropic monomer used in the present invention.

Referring to FIG. 2A, in the LCD panel of the present embodiment, the LC molecules 242 are positive optical anisotropic (the ordinary refractive rate $n_o$ greater than the extraordinary refractive rate $n_e$) and the monomers are negative optical anisotropic ($n_o$ less than $n_e$). In contrast, as the LC molecules of negative optical anisotropic ($n_o$ less than $n_e$) are adapted in the present embodiment, only the monomers of positive optical anisotropic ($n_o$ greater than $n_e$) can be used.

As described above, as the LCD panel is in the dark state, the optical axes of the negative-type LC molecules 242 biases toward the direction perpendicular to the applied electric field, which is parallel to the upper substrate 210 or the lower substrate 220. For a light beam L1 traveling normal to the LCD panel, the LC molecules 242 and the monomers 262 have the optical axes in directions substantially the same as the light beam L1. Thus, the light beam L1 shows no retardation after passing through the LC layer 240. Since the upper polarizer 212 has an absorption axis perpendicular to that of the lower polarizer 222, the light beam L1 passing through the lower polarizer 222, the lower substrate 220, the LC layer 240 (including the LC molecules 242 and the monomers 262), and the upper substrate 210 in a serial, but totally shielded by the upper polarizer 212.

For a light beam L2 traveling with a tilt angle, the optical axes of the LC molecules 242 and the monomers 262 are in directions different from the light beam L2. Thus, the light beam L2 must be engaged with some phase retardation from the LC molecules 242 and the monomers 262 respectively after passing through the LC layer 240. As described above, the LC molecules 242 and the monomers 262 are positive and negative optical anisotropic, respectively. The light beam L2 accesses opposite retardation events from the molecules 242 and the monomers 262. Thus, the unwanted retardation deviation from the LC molecules 242 can be compensated by the monomers 262 to prevent the light beam L2 passing through the upper polarizer 212 from light leakage.

Figure 3:
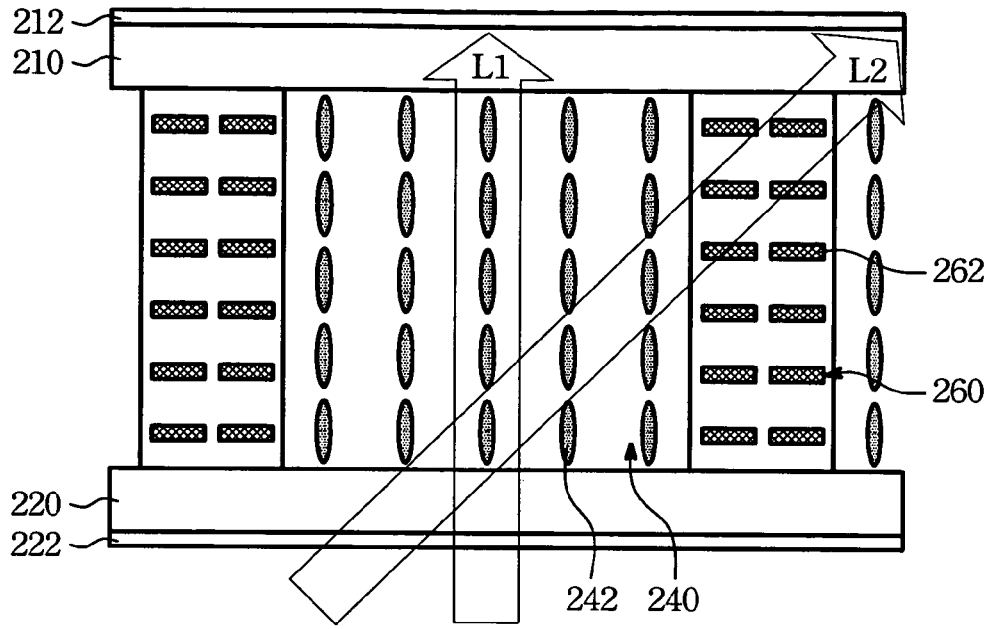
FIG. 3 is a cross section view depicting a second preferred embodiment of a wide viewing angle LCD panel in accordance with the present invention.

FIG. 3 shows a second preferred embodiment of a wide viewing angle LCD panel in accordance with the present invention. The LCD panel has an upper substrate 210, a lower substrate 220, an LC layer 240, and a polymer network 260. The lower substrate 220 is disposed under the upper substrate 210. A lower polarizer 222 is formed on a lower surface of the lower substrate 220. A upper polarizer 212 is formed on an upper surface of the upper substrate 210. The LC layer 240 is interposed between the two substrates 210 and 220.

In the present embodiment, the LC molecules 242 within the LC layer 240 are VA negative-type LC molecules. The polymer network 260 is composed of polymerized optical anisotropic monomers 262 and shows a wall-like structure extended from an upper surface of the lower substrate 220 toward the upper substrate 210. There may be a gap formed between the polymer network 260 and the upper substrate 210. The polymerization of the polymer network 260 restricts the orientation of the monomers 262 to guarantee the angle between the optical axes of the monomers 262 and the LC molecules 242 in the dark state less than 10 degree.

Referring to FIG. 3, in the LCD panel of the present embodiment, the LC molecules 242 are positive optical anisotropic ($n_o$ is greater than $n_e$) and the monomers are negative optical anisotropic ($n_o$ is less than $n_e$). As shown, when the LCD panel is in the dark state, the optical axes of the LC molecules 242 within the LC layer 240 are in directions perpendicular to the upper substrate 210 or the lower substrate 220. Thus, it is understood that the optical axes of the monomers 262 are also substantially perpendicular to the upper substrate 210 or the lower substrate 220. For the light beam L1 traveling normal to the LCD panel, the optical axes of the LC molecules 242 and the monomers 262 are substantially in directions the same as the light beam L1. Thus, the light beam L1 shows no retardation after passing through the LC layer 240 and the polymer network 260. Since the upper polarizer 212 has the absorption axis perpendicular to that of the lower polarizer 222, the light beam L1 passing through the lower polarizer 222 would be totally shielded by the upper polarizer 212.

For the light beam L2 traveling with a tilt angle, the optical axes of the LC molecules 242 and the monomers 262 are in directions different from the light beam L2. Thus, the light beam L2 must be engaged with some phase retardation from the LC molecules 242 and the monomers 262 in the polymer network 260, respectively, after passing through the LC layer 240. As described above, the LC molecules 242 are positive optical anisotropic. The monomers 262 of negative optical anisotropic are polymerized to maintain in directions perpendicular to the upper substrate 210 or the lower substrate 220. The light beam L2 accesses opposite retardation events from the LC molecules 242 and the monomers 262 respectively. Thus, the unwanted retardation deviation of the LC molecules 242 is compensated by the monomers 262 to prevent the light beam L2 passing through the upper polarizer 212 from light leakage.

In order to make sure the light beam L2 accessing enough opposite phase retardation from the monomers 262, the wall-like structure of the polymer network 260 may be extended from the upper surface of the lower substrate 220 toward the upper substrate 210, or the wall-like structure of the polymer network 260 should be at least extend from the lower substrate 220 upward or from the upper substrate 210 downward with a gap formed between the upper substrate 210 or the lower substrate 220 and the polymer network 260 smaller than half the thickness of the LC layer 240.

Figure 4:
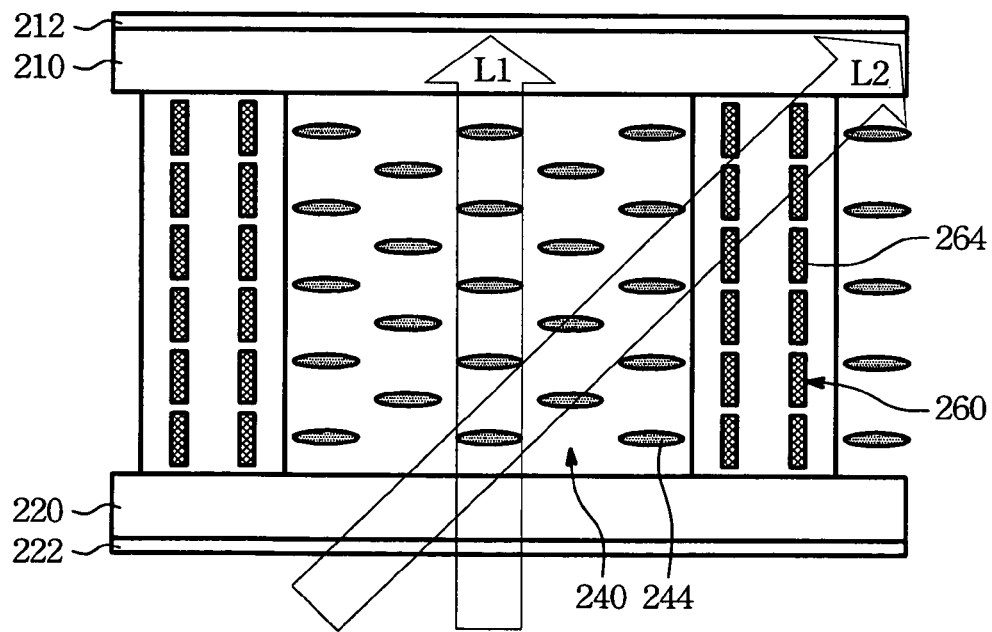
FIG. 4 is a cross section view depicting a third preferred embodiment of a wide viewing angle LCD panel in accordance with the present invention.

FIG. 4 shows a third preferred embodiment of the wide viewing angle LCD panel in accordance with the present invention. In contrast with the first embodiment of FIG. 2, the present embodiment uses horizontal aligned LC molecules, such as in-plane switch (IPS) LC molecules, instead. It should be noted that the optical axes of the monomers 264 within the polymer network 260 are parallel to the upper substrate 210 or the lower substrate 220, and an angle formed between the axes of the LC molecules 244 and the monomers 264 is less than 10 degree. For IPS LC molecules, the optical axes of the monomers 264 are substantially parallel to the upper substrate 210 or the lower substrate 220 where the monomers 264 are negative optical anisotropic. The optical axes of the monomers 264 are substantially perpendicular to the upper substrate 210 or the lower substrate 220 substrate, or substantially parallel to the upper substrate 210 or the lower substrate 220 but perpendicular to the optical axes of LC molecules 244 where the monomers 264 are positive optical anisotropic.

As the LCD panel is in the dark state, the optical axes of the LC molecules 244 in the LC layer 240 are parallel to the upper substrate 210 or the lower substrate 220 and perpendicular to the absorption axis of the lower polarizer 222. Since the light beam L1 shows linearly polarization in a direction perpendicular to absorption axis of the lower polarizer 222 entering the LC layer 240, the polarization direction of the light beam L1 and the optical axes of the LC molecules 244 are substantially pointing to the same direction. In addition, the optical axes of the monomers 264 and the LC molecules 244 are substantially pointing to the same direction. Thus, the light beam L1 accesses no retardation from the LC molecules 244 and the monomers 264. Since the absorption axis of the upper polarizer 212 is perpendicular to that of the lower polarizer 222, the light beam L1 passing through the lower polarizer 222 would be totally shielded by the upper polarizer 212.

For the light beam L2 traveling with a tilt angle, there are angles formed between the linearly polarization direction of the light beam L2 and the optical axes of the LC molecules 244 and the monomers 264, respectively. Thus, the light beam L2 must access retardation events from the LC molecules 244 and the monomers 264 within the polymer network 260 after passing through the LC layer 240. As described above, since the LC molecules 244 and the monomers 264 are positive and negative optical anisotropic respectively, the light beam L2 must access opposite retardation from the LC molecules 244 and the monomers 264. The unwanted retardation deviation from the LC molecules 244 can be compensated by the contribution of the monomers 264 so as to prevent the light beam L2 passing through the upper polarizer 212 from light leakage.

Although the above mentioned embodiments only describes the cases with VA type LC molecules 242 and IPS type LC molecules 244, typical twisted nematic (TN) type LC molecules can be applied in the present invention, just under the limitation that the angle between the optical axes of the anisotropic monomers and TN type LC molecules as the LCD panel in the dark state less than 10 degree.

Figure 5:
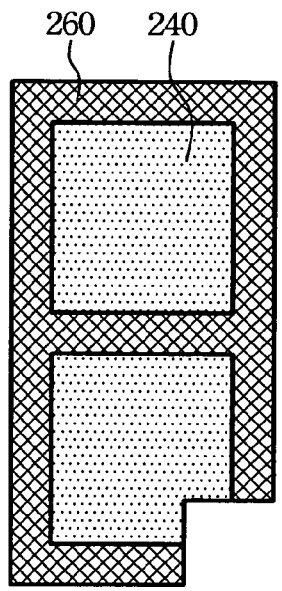
FIG. 5 is a top view depicting a first preferred embodiment of the layout of polymer network in a pixel device of the wide viewing angle LCD panel in accordance with the present invention.

FIG. 5 shows a top view of a first preferred embodiment of the polymer network layout within a pixel device in accordance with the present invention. As shown, the polymer network 260 is a quadrilateral network distributed in the LC layer 240 to make sure the light beams with large tilt angles traveling along various directions may access opposite phase retardation from the LC molecules and the monomers in the polymer network 260.

Figure 6:
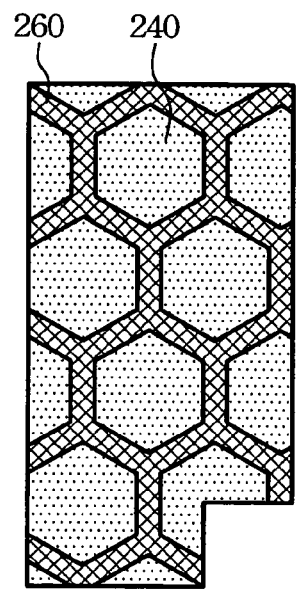
FIG. 6 is a top view depicting a second preferred embodiment of the layout of polymer network in a pixel device of the wide viewing angle LCD panel in accordance with the present invention.

FIG. 6 shows a top view of a second preferred embodiment of the polymer network layout within a pixel device in accordance with the present invention. As shown, the polymer network 260 is a hexagonal network 260 distributed in the LC layer 240 to make sure that the light beams with large tilt angles traveling along various directions may access opposite phase retardation from the LC molecules and the monomers in the polymer network 260.

Figure 7:
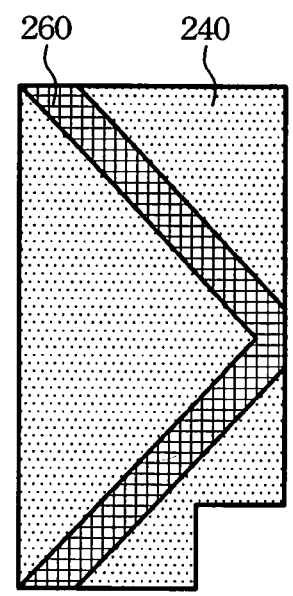
FIG. 7 is a top view depicting a third preferred embodiment of the layout of polymer network in a pixel device of the wide viewing angle LCD panel in accordance with the present invention.

FIG. 7 shows a top view of a third preferred embodiment of the polymer network layout within a pixel device in accordance with the present invention. As shown, the polymer network in the pixel device has two parts extended from a middle of an edge to both ends of an opposite edge to make sure that the light beams with large tilt angles traveling along various directions access opposite retardation from the LC molecules and the monomers in the polymer network 260.

Figure 8:
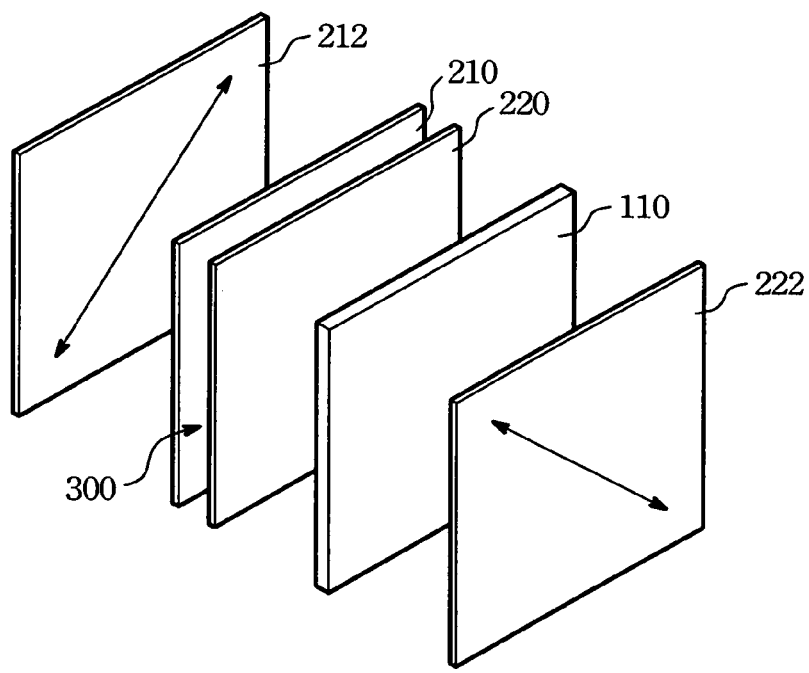
FIG. 8 is a schematic view depicting a fourth preferred embodiment of a wide viewing angle LCD panel in accordance with the present invention.

As mentioned above, the polymer network 260 adapted in the present invention restricts the orientation of the monomers 262, 264 so as to achieve the object of compensating the retardation deviations of light beam L2 passing through the LC molecules 242, 244 to increase the viewing angle of the LCD panel. Therefore, the compensator 110 described in related art can be omitted to reduce the fabrication cost, the weight, and the thickness of the LCD panel. In addition, for a concern of better compensation ability, in the fourth preferred embodiment of the LCD panel in accordance with the present invention as shown in FIG. 8, the compensator 110, such as an a-plate or a biaxial film, may be interposed between the lower substrate 220 and the lower polarizer 222 or the upper substrate 210 and the upper polarizer 212 (not shown) to further prevent the light leakage event of the LCD panel in the dark state.

While the embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

We claim:

1. A wide viewing angle liquid crystal display (LCD) panel comprising:
    an upper substrate;
    a lower substrate disposed below the upper substrate; and
    a liquid crystal (LC) layer, interposed between the upper substrate and the lower substrate, having LC molecules mixed with a predetermined proportion of anisotropic monomers;
    wherein an angle between optical axes of the an anisotropic monomers and the LC molecules is less than 10 degree as the wide viewing angle LCD panel is in a dark state and wherein the LC molecules are positive optical anisotropic while the monomers are negative optical anisotropic, and the LC molecules are negative optical anisotropic while the monomers are positive optical anisotropic.

2. The wide viewing angle LCD panel of claim 1, wherein the monomers are uniformly distributed in the LC layer.

3. The wide viewing angle LCD panel of claim 1, wherein the optical axes of the monomers and the LC molecules within the LC layer are substantially pointing toward the same direction as the LCD panel in the dark state.

4. The wide viewing angle LCD panel of claim 1, wherein the LC molecules are vertical aligned (VA) LC molecules.

5. The wide viewing angle LCD panel of claim 4, wherein the monomers are negative optical an isotropic, and the optical axes of the monomers are substantially perpendicular to the upper substrate or the lower substrate.

6. The wide viewing angle LCD panel of claim 4, wherein the monomers are positive optical an isotropic characteristic, and the optical axes of the monomers are substantially parallel to the upper substrate or the lower substrate.

7. The wide viewing angle LCD panel of claim 1, wherein the LC molecules are twisted nematic (TN) LC molecules.

8. The wide viewing angle LCD panel of claim 7, wherein the monomers are negative optical an isotropic characteristic, and the optical axes of the monomers are substantially perpendicular to the upper substrate or the lower substrate.

9. The wide viewing angle LCD panel of claim 7, wherein the monomers are positive optical an isotropic, and the optical axes of the monomers are substantially parallel to the upper substrate or the lower substrate.

10. The wide viewing angle LCD panel of claim 1, wherein the LC molecules are in-plane switch (IPS) LC molecules.

11. The wide viewing angle LCD panel of claim 10, wherein the monomers are negative optical an isotropic, and the optical axes of the monomers are substantially parallel to the upper substrate or the lower substrate.

12. The wide viewing angle LCD panel of claim 10, wherein the monomers are positive optical an isotropic, and the optical axes of the monomers are substantially perpendicular to the upper substrate or the lower substrate.

13. The wide viewing angle LCD panel of claim 1, wherein at least part of the monomers are polymerized to form a polymer network.

14. The wide viewing angle LCD panel of claim 13, wherein the polymer network is a wall-like structure extending from the lower substrate toward the upper substrate with a gap formed between the polymer network and the upper substrate.

15. The wide viewing angle LCD panel of claim 13, wherein the polymer network is a wall-like structure extended from the lower substrate toward the upper substrate.

16. The wide viewing angle LCD panel of claim 14, wherein the gap is greater than half the thickness of the LC layer.

17. The wide viewing angle LCD panel of claim 1, further comprising an upper polarizer disposed over the upper substrate, and a lower polarizer disposed below the lower substrate, wherein the absorption axes of the upper polarizer and the lower polarizer are substantially perpendicular with each other.

18. The wide viewing angle LCD panel of claim 17, further comprising a compensator interposed between the upper polarizer and the upper substrate.

19. The wide viewing angle LCD panel of claim 17, further comprising a compensator interposed between the lower polarizer and the lower substrate.

* * * * *